United States Patent [19]

Narayanan

[11] Patent Number: 5,622,003
[45] Date of Patent: Apr. 22, 1997

[54] SEED COATING CONTAINING MN $(NO_3)_2 \cdot 6H_2O$

[75] Inventor: Kolazi S. Narayanan, Wayne, N.J.

[73] Assignee: ISP Investments Inc., Wilmington, Del.

[21] Appl. No.: 500,660

[22] Filed: Jul. 11, 1995

[51] Int. Cl.$^6$ .................................................. A01C 1/06
[52] U.S. Cl. ................................................................ 47/57.6
[58] Field of Search ............................ 47/57.6; 71/64.02, 71/64.07

[56] References Cited

U.S. PATENT DOCUMENTS 4,272,417  6/1981  Barke et al. ................................ 47/57.6
4,729,190  3/1988  Lee ............................................. 47/57.6
5,425,955  6/1995  Narayanan ................................ 424/505

*Primary Examiner*—James R. Feyrer
*Attorney, Agent, or Firm*—Walter Katz; Marilyn J. Maue; Joshua J. Ward

[57] ABSTRACT

What is described herein are homogeneous, aqueous, non-freezing seed coating compositions containing high loadings of a nutrient such as $Mn(NO_3)_2.6H_2O$.

13 Claims, No Drawings

SEED COATING CONTAINING MN (NO₃)₂ ·6H₂O

BACKGROUND OF THE INVENTION

1. Field of the Invention

This invention relates to seed coating compositions, and, more particularly, to a homogeneous, aqueous, non-freezing seed coating composition having a high loading of nutrient and an advantageous viscosity.

2. Description of the Prior Art

Seed coating compositions containing a nutrient, e.g. $MnSO_4$ hydrate, have been formulated as a dispersion in a non-aqueous medium which separates at room temperature. Accordingly, it is desired to provide a stable, homogeneous, aqueous, non-freezing seed coating composition, and matrix therefor, which has a high loading of the nutrient constituent therein, an advantageous viscosity for convenient application onto plants, and which includes a film-former to retain the composition on the plant for an extended period, and a anti-freezer component which can function as a plasticizer during transfer of the nutrient to the leaf of the plant.

DESCRIPTION OF THE INVENTION

In accordance with the invention, there is provided herein a new and useful seeding coating composition, and matrix formulation therefor. The use seed coating composition is a homogeneous, aqueous, non-freezing seed coating composition comprising, by weight:

(a) as a nutrient, e.g. 40–60% $Mn(NO_3)_2.6H_2O$, (b) as a film-former, e.g. 0.5–8% of a water-soluble polymer, (c) as a plasticizer and anti-freezer, e.g. 20–30% N-methylpyrrolidone, and (d) as cosolvent, water, 15–30%.

The preferred composition comprises:

(a) 45–55%; (b) 1–3%; (c) 22–28%; and (d) 18–25%.

The nutrient (a) can be any well known additive for seed composition, including chelating agents such as ethylene diaminetetraacetic acid (EDTA), or their equivalents, and derivatives, a manganese salt, and the like.

The film-former component, (b), suitably is a vinyl pyrrolidone polymer, such as polyvinylpyrrolidone (PVP); and copolymers of PVP and an alkene, e.g. butene; vinyl acetate or dimethylaminoethyl methacrylate; or a copolymer of maleic acid/ester/anhydride and alkyl vinyl ether.

The composition has a Brookfield viscosity at room temperature of <1000 cps, preferably <500 cps; and at −10° C. of <1500 cps, preferably <1000 cps.

The seed coating composition may be prepared from a matrix formulation which includes (b) 1–16% of the water soluble polymer, (c) 30–95% of N-methylpyrrolidone, and (d) 5–70% of water.

Preferably the matrix comprises (b) 2–6%; (c) 40–60%; and (d) 40–60%.

EXAMPLES

Seed Coating Compositions of Invention

TABLE 1

| Component | EX. NO. 1 | 2 | 3 | 4 |
|---|---|---|---|---|
| | % by Wt. | | | |
| $Mn(NO_3)_2.6H_2O$ | 51.50 | 51.50 | 51.50 | 51.51 |
| Agsol ® Ex 1 (ISP*) (N-methylpyrrolidone) | 24.65 | 24.64 | 24.65 | 23.06 |
| $H_2O$ | 21.85 | 21.85 | 21.85 | 20.44 |
| Agrimer ® 30 (ISP) (PVP K-30) | 2.00 | 0.00 | 0.00 | 5.00 |
| Agrimer ® VA6 (ISP) (PVP-vinyl acetate) | 0.00 | 2.00 | 0.00 | 0.00 |
| Agrimer ® Al 10 (ISP) (PVP-Butene) | 0.00 | 0.00 | 2.00 | 0.00 |
| Agrimer ® DA1 W (ISP) (PVP/DMAEMA) | 0.00 | 0.00 | 0.00 | 0.00 |
| Total | 100.00 | 100.00 | 100.00 | 100.00 |
| Brookfield Viscosity (cps), R.T. | 50 | 50 | 50 | 50 |

*International Specialty Products

TABLE 2

| Component | EX. NO. 5 % by Wt. |
|---|---|
| $Mn(NO_3)_2.6H_2O$ | 51.47 |
| Agsol ® Ex 1 (N-methylpyrrolidone) | 32.62 |
| $H_2O$ | 10.91 |
| Agrimer ® 30 (PVP K-30) | 0.00 |
| Agrimer ® VA6 (PVP-vinyl acetate) | 0.00 |
| Agrimer ® Al 10 (PVP-Butene) | 5.00 |
| Agrimer ® DA1 W (PVP/DMAEMA) | 0.00 |
| Total | 100.00 |
| Brookfield Viscosity (cps), R.T. | 80 |

TABLE 3

| Component | EX. NO. 6 | 7 |
|---|---|---|
| | % by Wt. | |
| $Mn(NO_3)_2.6H_2O$ | 51.50 | 51.50 |
| Agsol ® Ex 1 (N-methylpyrrolidone) | 41.85 | 41.85 |
| $H_2O$ | 4.65 | 4.65 |
| Agrimer ® 30 (PVP K-30) | 2.00 | 0.00 |
| Agrimer ® VA6 (PVP-vinyl acetate) | 0.00 | 0.00 |
| Agrimer ® Al 10 (PVP-Butene) | 0.00 | 2.00 |
| Agrimer ® DA1 W (PVP/DMAEMA) | 0.00 | 0.00 |
| Total | 100.00 | 100.00 |

TABLE 4

| | EX. NO. | |
|---|---|---|
| | 8 | 9 |
| Component | % by Wt. | |
| Mn(NO$_3$)$_2$.6H$_2$O | 51.50 | 51.50 |
| Agsol ® Ex 1 (N-methylpyrrolidone) | 34.87 | 34.87 |
| H$_2$O | 11.63 | 11.63 |
| Agrimer ® 30 (PVP K-30) | 0.00 | 0.00 |
| Agrimer ® VA6 (PVP-vinyl acetate) | 2.00 | 0.00 |
| Agrimer ® Al 10 (PVP-Butene) | 0.00 | 0.00 |
| Agrimer ® DA1 W (PVP/DMAEMA) | 0.00 | 2.00 |
| Total | 100.00 | 100.00 |

The matrix formulation of the invention is illustrated in Table 5 below.

TABLE 5

| Component | Weight, g. |
|---|---|
| Manganese Nitrate Hexahydrate | 515 |
| Agsol ® Ex 1 | 247 |
| Agrimer ® AL 10 | 20 |
| Water | to 1 kg |

Method of Manufacture (1) Dissolve Manganese Hexahydrate (515 g) in 90% of water requirement (180 g).
(2) In a separate vessel dissolve Agrimer® AL 10 (20 g) in Agsol® Ex 1 (247 g).
(3) Combine two solutions in a single vessel and add remaining water up to required weight (1 kg).
(4) Mix until solution is homogeneous.

The Mn(NO$_3$)$_2$.XH$_2$O also can be generated from commercially available sources such as by reaction of MnO with nitric acid, followed by neutralization of the excess nitric acid with a suitable base.

RESULTS

The composition of Ex. No. 3, Table 1 was coated on the seeds and the seeds (Spring Barley) were planted. The results of Mn uptake by the leaves and sprouting seedlings and germination are shown in Tables 6–10 below.

The practical advantages of using the composition of the invention are illustrated below.

Uptake of Mn on Plant, Spring Barley 10 days old leaves.

TABLE 6

| Treatment | Dose (hkg) | Manganese Uptake (mg/kg) |
|---|---|---|
| Control | — | 63.0 |
| Cillus Mn Ex. No. 3 (Table 1) | 100 ml | 81.3 |
| Cillus Mn Ex. No. 3 (Table 1) | 200 ml | 107.5 |
| Cillus Mn Ex. No. 3 (Table 1) | 300 ml | 125.0 |

TABLE 7

| Treatment | Dose (hkg) | Emergence (after 6 days) |
|---|---|---|
| Control | — | 47.5 |
| Cillus Mn Ex. No. 3 (Table 1) | 100 ml | 48.8 |
| Cillus Mn Ex. No. 3 (Table 1) | 200 ml | 38.8 |
| Cillus Mn Ex. No. 3 (Table 1) | 300 ml | 46.3 |

TABLE 8

| Treatment | Dose (hkg) | Germination (after 7 days) |
|---|---|---|
| Control | — | 92 |
| Cillus Mn Ex. No. 3 (Table 1) | 100 ml | 94 |
| Cillus Mn Ex. No. 3 (Table 1) | 200 ml | 86 |
| Cillus Mn Ex. No. 3 (Table 1) | 300 ml | 90 |

TABLE 9

| Treatment | Dose (hkg) | Germination (after 10 days) |
|---|---|---|
| Control | — | 93 |
| Cillus Mn Ex. No. 3 (Table 1) | 100 ml | 94 |
| Cillus Mn Ex. No. 3 (Table 1) | 200 ml | 88 |
| Cillus Mn Ex. No. 3 (Table 1) | 300 ml | 90 |

TABLE 10

| Treatment | Dose (hkg) | Crop Posture (on 0–10 scale, after 7 days) |
|---|---|---|
| Control | — | 9.4 |
| Cillus Mn Ex. No. 3 (Table 1) | 100 ml | 9.9 |
| Cillus Mn Ex. No. 3 (Table 1) | 200 ml | 9.0 |
| Cillus Mn Ex. No. 3 (Table 1) | 300 ml | 9.4 |

TABLE 11

| Treatment | Dose (hkg) | Crop Posture (on 0–10 scale, after 10 days) |
|---|---|---|
| Control | — | 10.0 |
| Cillus Mn Ex. No. 3 (Table 1) | 100 ml | 10.0 |
| Cillus Mn Ex. No. 3 (Table 1) | 200 ml | 9.5 |
| Cillus Mn Ex. No. 3 (Table 1) | 300 ml | 10.0 |

In summary, the data above demonstrated that when the composition of the invention was tested against commercial seed compositions, the Mn uptake was 30–100% higher than the control, or commercial compositions, when tested on 10 days old spring barley leaves (Table 6). Commercial compositions showed an uptake of 61–64 mg/kg, and 81–92 mg/kg, using 100 ml–300 ml of the test compositions. The data on crop posture, emergence and germination show no detrimental effects.

While the invention has been described with particular reference to certain embodiments thereof, it will be understood that changes and modifications may be made which are within the skill of the art. Accordingly, it is intended to be bound only by the following claims.

What is claimed is:

1. A method of use in coating seeds which comprises applying to seeds a homogeneous, aqueous, non-freezing seed coating composition comprising:
   (a) as a nutrient, 40–60% $Mn(NO_3)_2 \cdot 6H_2O$,
   (b) as a film former, 0.5–8% of a water soluble polymer,
   (c) as a plasticizer and antifreezer, 20–30% N-methylpyrrolidone, and
   (d) as cosolvent, water, 10–15%.

2. Seeds coated with a homogeneous, aqueous, non-freezing seed coating composition which comprises, by weight:
   (a) as a nutrient, 40–60% $Mn(NO_3)_2 \cdot 6H_2O$,
   (b) as a film former, 0.5–8% of a water soluble polymer,
   (c) as a plasticizer and antifreezer, 20–30% N-methylpyrrolidone, and
   (d) as cosolvent, water, 10–15%.

3. A homogeneous, aqueous, non-freezing seed coating composition comprising, by weight:
   (a) as a nutrient, 40–60% $Mn(NO_3)_2 \cdot 6H_2O$,
   (b) as a film-former, 0.5–8% of a water soluble polymer,
   (c) as a plasticizer and antifreezer, 20–30% N-methylpyrrolidone, and
   (d) as cosolvent, water, 15–30%.

4. A composition according to claim 3 wherein
   (a) is 45–55%; (b) is 1–3%; (c) is 22–28%; and (d) is 18–25%.

5. A composition according to claim 3 wherein (b) is a vinyl pyrrolidone polymer.

6. A composition according to claim 3 wherein (b) is a polymer selected from the group consisting of polyvinylpyrrolidone, copolymers of vinyl pyrrolidone and butene, vinyl acetate or dimethylaminoethyl methacrylate, and a polymer of maleic anhydride and methyl vinyl ether.

7. A composition according to claim 3 which has a Brookfield viscosity at room temperature of <1000 cps.

8. A composition according to claim 3 which has a Brookfield viscosity at −10° C. of <1500 cps.

9. A composition according to claim 3 which has a Brookfield viscosity at −10° C. of <1000 cps.

10. A matrix formulation for forming a homogeneous, aqueous, non-freezing seed coating composition having (a) a nutrient, (b) a film-former, (c) a plasticizer and antifreezer, and (d) a cosolvent, comprising, by weight:
    (b) as film-former, 1–16% of a water soluble polymer,
    (c) as plasticizer and antifreezer, 30–95% of N-methylpyrrolidone, and
    (d) water, 5–70%.

11. A matrix formulation according to claim 10 in which (b) is 2–6%, (c) is 40–60%, and (d) is 40–60%.

12. A matrix formulation according to claim 10 in which (b) is a vinyl pyrrolidone polymer.

13. A matrix formulation according to claim 10 wherein (b) is a polymer selected from the group consisting of polyvinylpyrrolidone, copolymers of vinyl pyrrolidone and butene, vinyl acetate or dimethylaminoethyl methacrylate, and a copolymer of maleic anhydride and methyl vinyl ether.

* * * * *